US011250251B2

(12) United States Patent
Ong et al.

(10) Patent No.: US 11,250,251 B2
(45) Date of Patent: Feb. 15, 2022

(54) METHOD FOR IDENTIFYING POTENTIAL ASSOCIATES OF AT LEAST ONE TARGET PERSON, AND AN IDENTIFICATION DEVICE

(71) Applicant: NEC CORPORATION, Tokyo (JP)

(72) Inventors: Hui Lam Ong, Singapore (SG); Satoshi Yamazaki, Singapore (SG); Wei Jian Peh, Singapore (SG); Hong Yen Ong, Singapore (SG)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/642,279

(22) PCT Filed: Aug. 16, 2019

(86) PCT No.: PCT/JP2019/032161
§ 371 (c)(1),
(2) Date: Feb. 26, 2020

(87) PCT Pub. No.: WO2020/049980
PCT Pub. Date: Mar. 12, 2020

(65) Prior Publication Data
US 2020/0394395 A1 Dec. 17, 2020

(30) Foreign Application Priority Data
Sep. 6, 2018 (SG) ............................ 10201807678W (51) Int. Cl.
*G06K 9/00* (2006.01)
(52) U.S. Cl.
CPC ..... *G06K 9/00369* (2013.01); *G06K 9/00228* (2013.01); *G06K 9/00335* (2013.01);
(Continued)

(58) Field of Classification Search
CPC ........... G06K 9/00288; G06K 9/00221; G06K 9/00295; G06K 9/00369; G06K 9/00228;
(Continued)

(56) References Cited

U.S. PATENT DOCUMENTS 9,965,687 B2 * 5/2018 Loce ................. G08B 13/19613
9,977,970 B2 * 5/2018 Loce ................. G08B 13/19608
(Continued)

FOREIGN PATENT DOCUMENTS

JP 2003-348569 A 12/2003
JP 2005-234765 A 9/2005
(Continued)

OTHER PUBLICATIONS

Communication dated Sep. 15, 2020, from the Japanese Patent Office in Application No. 2020-508641.
(Continued)

*Primary Examiner* — Kenny A Cese
(74) *Attorney, Agent, or Firm* — Sughrue Mion, PLLC (57) ABSTRACT

There is provided a method for identifying potential associates of at least one target person, the method comprising: providing a plurality of videos; identifying appearances of the at least one target person in the plurality of videos; establishing a plurality of video scenes from the plurality of videos, wherein each one of the plurality of video scenes begins at a first predetermined duration before a first appearance of the at least one target person in the respective video scene and ends at a second predetermined duration after a last appearance of said at least one target person in the respective video scene; determining individuals who appear in more than a predetermined threshold number of the plurality of video scenes; and identifying the individuals as potential associates of the at least one target person.

15 Claims, 6 Drawing Sheets

(52) U.S. Cl.
CPC ..... *G06K 9/00765* (2013.01); *G06K 9/00771* (2013.01); *G06K 9/00221* (2013.01); *G06K 9/00295* (2013.01)

(58) Field of Classification Search
CPC ........... G06K 9/00335; G06K 9/00765; G06K 9/00771; G06F 16/784
See application file for complete search history.

(56) References Cited

U.S. PATENT DOCUMENTS

| | | | | |
|---|---|---|---|---|
| 2014/0205158 | A1* | 7/2014 | Fukazawa | G06K 9/6218 382/118 |
| 2015/0248587 | A1* | 9/2015 | Oami | H04N 7/181 382/103 |
| 2018/0018504 | A1 | 1/2018 | Sotodate et al. | |
| 2018/0150694 | A1* | 5/2018 | Guttmann | G06K 9/00677 |
| 2019/0132556 | A1* | 5/2019 | Itoh | G06T 7/254 |

FOREIGN PATENT DOCUMENTS

| | | |
|---|---|---|
| JP | 2010-191620 A | 9/2010 |
| JP | 2015-082820 A | 4/2015 |
| JP | 2016-143335 A | 8/2016 |
| JP | 2018-061212 A | 4/2018 |
| JP | 2018-523886 A | 8/2018 |
| WO | 2015/166612 A1 | 11/2015 |
| WO | 2017/130902 A1 | 8/2017 |
| WO | WO-2017163282 A1 * | 9/2017 ............. H04N 7/181 |
| WO | 2018/116488 A1 | 6/2018 |

OTHER PUBLICATIONS

International Search Report for PCT/JP2019/032161 dated Oct. 29, 2019 [PCT/ISA/210].
Written Opinion for PCT/JP2019/032161 dated Oct. 29, 2019 [PCT/ISA/237].
Japanese Office Action for JP Application No. 2020-172466 dated Dec. 7, 2021 with English Translation.

* cited by examiner

METHOD FOR IDENTIFYING POTENTIAL ASSOCIATES OF AT LEAST ONE TARGET PERSON, AND AN IDENTIFICATION DEVICE

CROSS REFERENCE TO RELATED APPLICATIONS

This application is a National Stage of International Application No. PCT/JP2019/032161 filed Aug. 16, 2019, claiming priority based on Singaporean Patent Application No. 10201807678 W filed Sep. 6, 2018, the disclosure of which is incorporated herein in its entirety by reference.

TECHNICAL FIELD

The present invention generally relates to methods for identifying potential associates of at least one target person, and identification devices.

BACKGROUND ART

An organized crime group can be defined as a group of people working together on a continuing basis for coordination and planning of criminal activities. Their group structures vary, often consisting of a durable core of key individuals, cluster of subordinates, specialists, and other more transient members, plus an extended network of associates. Many such groups are often loose networks of criminals that come together for a specific criminal activity, acting in different roles depending on their skills and expertise.

To discover an organized crime group network of associates, apart from digital/cyberspace monitoring, the physical world's video surveillance systems can be the extended eye of law enforcement agencies to monitor and discover the potential network of associates.

SUMMARY OF INVENTION

Solution to Problem

According to a first aspect, there is provided a method for identifying potential associates of at least one target person, the method comprising: providing a plurality of videos; identifying appearances of the at least one target person in the plurality of videos; establishing a plurality of video scenes from the plurality of videos, wherein each one of the plurality of video scenes begins at a first predetermined duration before a first appearance of the at least one target person in the respective video scene and ends at a second predetermined duration after a last appearance of said at least one target person in the respective video scene; determining individuals who appear in more than a threshold number of the plurality of video scenes; and identifying the individuals as potential associates of the at least one target person.

According to a second aspect, there is provided an identification device configured to identify potential associates of at least one target person, the identification device comprising: a receiving module configured to receive a plurality of videos; an appearance search module configured to identify appearances of the at least one target person in the plurality of videos; an appearance consolidator module configured to establish a plurality of video scenes from the plurality of videos, wherein each one of the plurality of video scenes begins at a first predetermined duration before a first appearance of the at least one target person in the respective video scene and ends at a second predetermined duration after a last appearance of said at least one target person in the respective video scene; a co-appearance search module configured to search for individuals who appear in the plurality of video scenes; an appearance analyzer module configured to determine which of the individuals appear in more than a predetermined threshold number of the plurality of video scenes; and an output module configured to identify the individuals who appear in more than a predetermined threshold number of the plurality of video scenes as the potential associates of the at least one target person.

According to a third aspect, there is provided a non-transitory computer readable medium having stored thereon instructions which, when executed by a processor, make the processor carry out a method for identifying potential associates of at least one target person, the method comprising: receiving a plurality of videos; identifying appearances of the at least one target person in the plurality of videos; establishing a plurality of video scenes from the plurality of videos, wherein each one of the plurality of video scenes begins at a first predetermined duration before a first appearance of the at least one target person in the respective video scene and ends at a second predetermined duration after a last appearance of said at least one target person in the respective video scene; determining individuals who appear in more than a threshold number of the plurality of video scenes; and identifying the individuals as potential associates of the at least one target person.

BRIEF DESCRIPTION OF DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with a present embodiment.

DESCRIPTION OF EMBODIMENTS

Various embodiments provide devices and methods for identifying potential associates of at least one target person.

The physical world's video surveillance systems have long been the extended eye of law enforcement agencies to monitor criminal activities and discover the potential associates of organized crime groups, apart from digital/cyber surveillance.

Video surveillance systems are usually built and deployed to identify registered personnel, but some of the more advanced surveillance system also has the ability to track and associate people who are captured on camera together to build a registered person connection network. Video surveillance systems are usually built and deployed to identify specific targeted persons, but some of the more advanced surveillance systems also have the ability to track and associate people that are seen together with them to build a registered person connection network.

These existing solutions might be useful, but are limited to or are more suitable to discover the relation link among family members as well as friends and colleagues. Such solutions will also fail to discover hidden associates of a target person, especially in situations where the target person and his associates are not captured on camera together. For example, organized crime group's key individuals and their extended network of associates tend to stay off the grid and avoid being seen together to hide their connection during planning or execution of criminal activities. Most of them try to avoid communication through phone, emails, social networks (facebook, linkedin, etc) and instant messengers (whatsapp, line, wechat, etc) where there is a possibility to obtain the communication evidence through digital tracing by authorized law enforcers.

Further, some organized crime group members might make indirect contact or exchange information with their extended network of associates in crowded public areas that make it easier to cover their tracks and appearance. There is no surprise that some associates might not even know who they are communicating with. For instance, a first associate may be required to retrieve a physical object left in a public location by a second associate. By the time the first associate arrives at the designated public location to retrieve the object, the second associate may already have left. Even with a video surveillance system installed to monitor the location, both associates will not be caught on camera together since there is no direct communication between them.

As a result of such careful ways of communication, there is difficulty for law enforcers to monitor and discover associates of such organized crime groups.

Hence, there exists a need to provide a solution to the above-mentioned problem.

The present invention provides a solution to the above-mentioned problem. During analysis of videos captured by surveillance cameras to identify possible associates of a target person, by extending the analysis range to include a period of time before a first appearance of the target person at a location captured by the surveillance cameras and another period of time after a last appearance of the target person at the same location, it is possible to discover unknown associates of the target person.

The results are further improved when videos of more than one target persons who belong to a same group are analysed. For example, if an unknown individual is found to appear in more than a threshold number of the videos, the probability that the unknown individual is an associate of the target persons is higher.

Advantageously, the present invention allows identification of potential associates of a target person, even if they are not co-appearing together in the videos.

Advantageously, the probability that the identified potential associates are indeed associates of the target person is increased when videos of more than one target persons are analysed.

Figure 1:
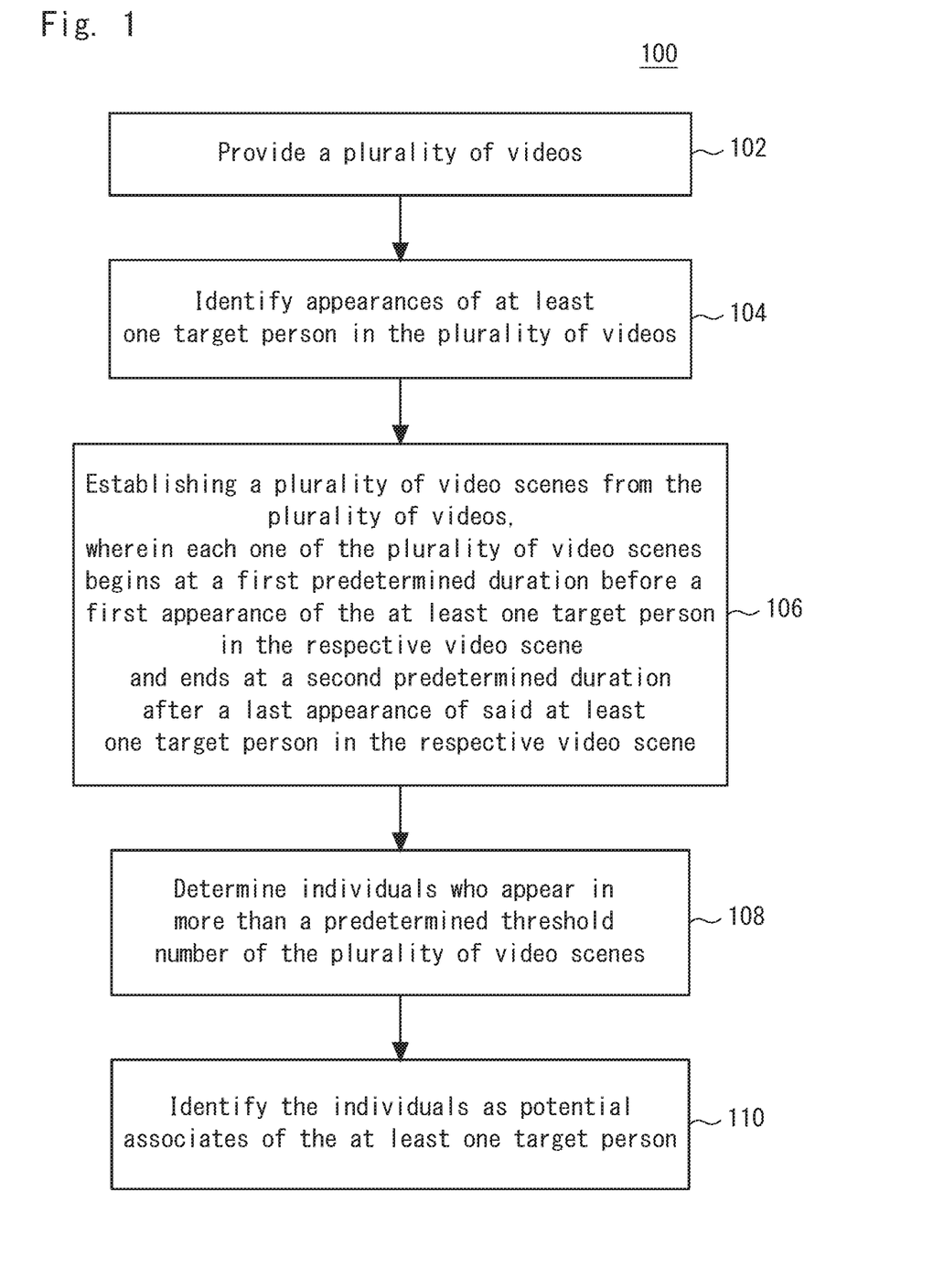
FIG. 1 shows a flow diagram illustrating a method for identifying potential associates of at least one target person according to various embodiments.

FIG. 1 shows a flow chart illustrating a method for identifying potential associates of at least one target person. In 102, a plurality of videos is provided. The plurality of videos may be video recordings of locations captured by surveillance cameras, hand phone cameras, CCTV (closed-circuit television) cameras, web-cams or other similar devices. The locations may be places where the at least one target person has been seen, known to have been to or frequented, or suspected locations where the at least one target person provides or receives information to or from associates of the same criminal group. The plurality of videos may be in a file format such as mp4, avi, mkv, wmv, mov or other similar video format. Further, each of the plurality of videos may indicate a time, date and location at which each respective video is recorded. In an embodiment, the plurality of videos may be processed into an entry database consisting of one or more entries, wherein each of the one or more entries represents an appearance of a person at a time, date and location in the plurality of videos, wherein each of the one or more entries indicates an attribute of the person.

In 104, appearances of the at least one target person in the plurality of videos are identified. This identification process may be achieved by determining an attribute of the respective target person, and then identifying, from the plurality of videos, an individual possessing the attribute as the respective target person. For example, the attribute may be facial information of the at least one target person which may be determined from a picture of the at least one target person's face. The attribute may also be a physical characteristic of the at least one target person, for example height, body size, hair colour, skin colour, other physical features or combinations thereof of such features that may be used to identify the at least one target person from the plurality of videos. The attribute may also be a behavioural characteristic of the at least one target person such as, for example, the way the at least one target person walks, stands, moves, talks, other similar characteristics or combinations thereof that may be used to identify the target person from the plurality of videos.

In 106, a plurality of video scenes is established from the plurality of videos, wherein each one of the plurality of video scenes begins at a first predetermined duration before a first appearance of the at least one target person in the respective video scene and ends at a second predetermined duration after a last appearance of said at least one target person in the respective video scene. Each of the plurality of video scenes may comprise surveillance footage of a location where at least one appearance of the targeted person is identified. Practically, most locations would typically have more than one surveillance camera installed to monitor the respective locations, such that each of these surveillance cameras may either provide surveillance for different parts of the location, or monitor the location from different views or angles. Therefore, each of the plurality of video scenes may further comprise one or more camera surveillance footages of a respective location where at least one appearance of the respective target person is identified. Advantageously, taking into consideration all available surveillance footages of a location can cover scenarios in which the target person is at a spot where only one of the surveillance cameras can capture the person on video.

Further, each of the plurality of video scenes is established such that each video scene begins at a first predetermined duration before a first identified appearance of the at least one target person, and ends at a second predetermined duration after a last appearance of the at least one target person. For example, where a first and a last appearance of a target person at a location is at 2 pm and 3 pm on a same date respectively with intermediate appearances at 2.10 pm, 2.25 pm, 2.40 pm and 2.50 pm, and the first and second predetermined duration are set as 20 minutes and 25 minutes respectively, then the resulting video scene will begin at 1.40 pm and end at 3.25 pm on the same date.

In 108, individuals who appear in more than a predetermined threshold number of the plurality of video scenes are determined. The individuals refer to all other persons besides the at least one target person who appear in the plurality of video scenes. These individuals do not need to be seen communicating with the at least one target person in the plurality of video scenes in order to be considered as potential associates, as long as they are found to appear in more than a predetermined threshold number of video scenes. The predetermined threshold number may be determined by trial and error, and may vary depending on the quantity or quality of videos to be analysed. Appearances of each individual may be identified based on a determined attribute of the respective individual, such as facial information, physical characteristics, behaviour characteristics or other attributes that may be used to identify the individual.

In 110, the individuals who appear in more than the predetermined threshold number of the video scenes are identified as potential associates of the at least one target person.

Figure 2:
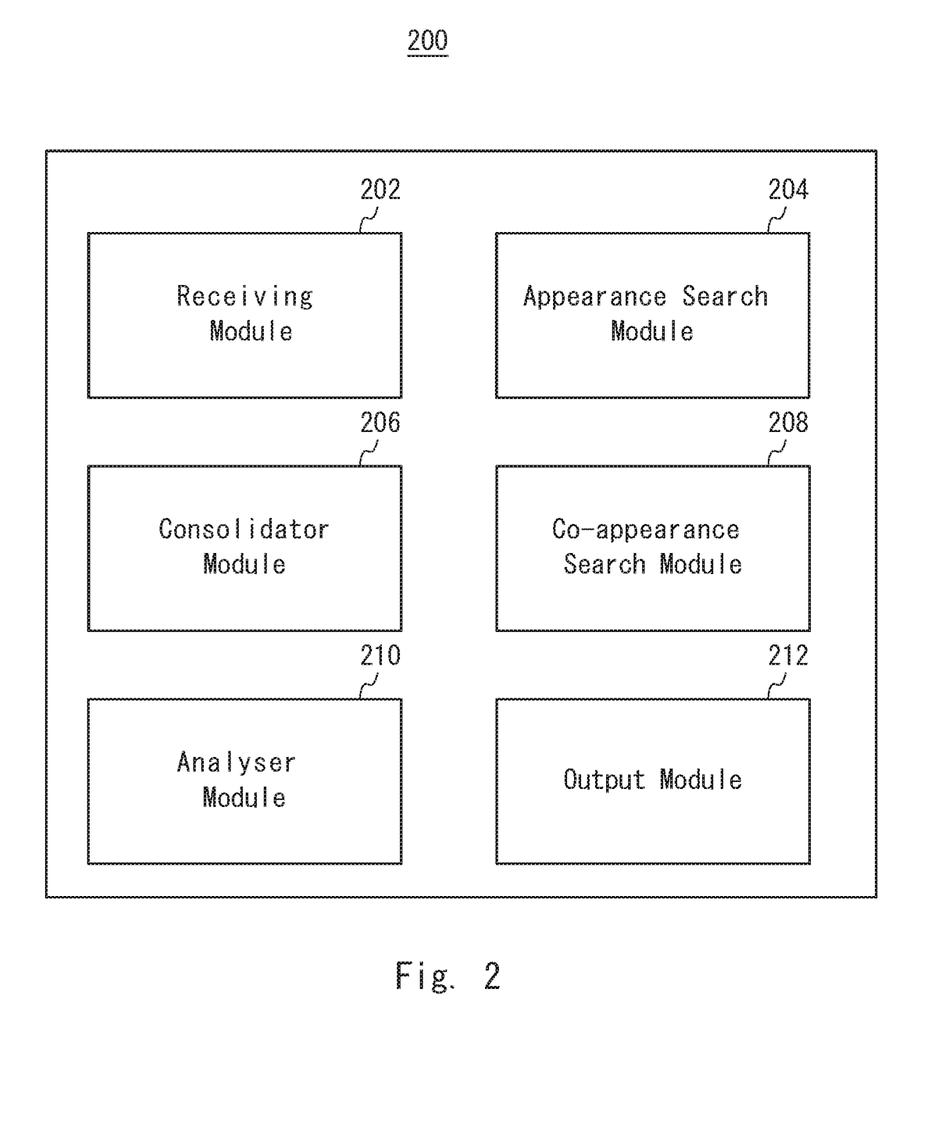
FIG. 2 shows an identification device for implementing the method illustrated in FIG. 1, according to various embodiments.

FIG. 2 shows an identification device 200 configured to implement the method illustrated in FIG. 1. The device 200 includes a receiving module 202, an appearance search module 204, a consolidator module 206, a co-appearance search module 208, an analyser module 210 and an output module 212.

The receiving module 202 is configured to receive a plurality of videos. The plurality of videos may be video recordings of locations captured by surveillance cameras, hand phone cameras, CCTV (closed-circuit television) cameras, web-cams or other similar devices. The locations may be places where the at least one target person has been seen, known to have been to or frequented, or suspected locations where the at least one target person provides or receives information to or from associates of the same criminal group. The plurality of videos may be in a file format such as mp4, avi, mkv, wmv, mov or other similar video format. Further, each of the plurality of videos may indicate a time, date and location at which each respective video is recorded.

The appearance search module 204 is configured to identify appearances of the at least one target person in the plurality of videos. In an embodiment, the appearance search module 204 may be further configured to determine an attribute of a respective target person of the at least one target person and identify, from the plurality of videos, an individual possessing the attribute as the respective target person. For example, the attribute may comprise facial information, a physical characteristic or a behavioural characteristic of the respective target person.

The appearance consolidator module 206 is configured to establish a plurality of video scenes from the plurality of videos, wherein each one of the plurality of video scenes begins at a first predetermined duration before a first appearance of the at least one target person in the respective video scene and ends at a second predetermined duration after a last appearance of said at least one target person in the respective video scene. In an embodiment, the plurality of video scenes may further comprise one or more camera surveillance footage of a location. Further, each of the one or more camera surveillance footages may show a different view of the location.

The co-appearance search module 208 is configured to search for individuals who appear in the plurality of video scenes. In an embodiment, appearances of each individual may be identified based on a determined attribute of the respective individual, such as facial information, physical characteristics, behaviour characteristics or other attributes that may be used to identify the individual.

The appearance analyzer module 210 is configured to determine which of the individuals appear in more than a predetermined threshold number of the plurality of video scenes. The output module 212 is configured to identify the individuals who appear in more than a predetermined threshold number of the plurality of video scenes as the potential associates of the at least one target person.

Figure 3:
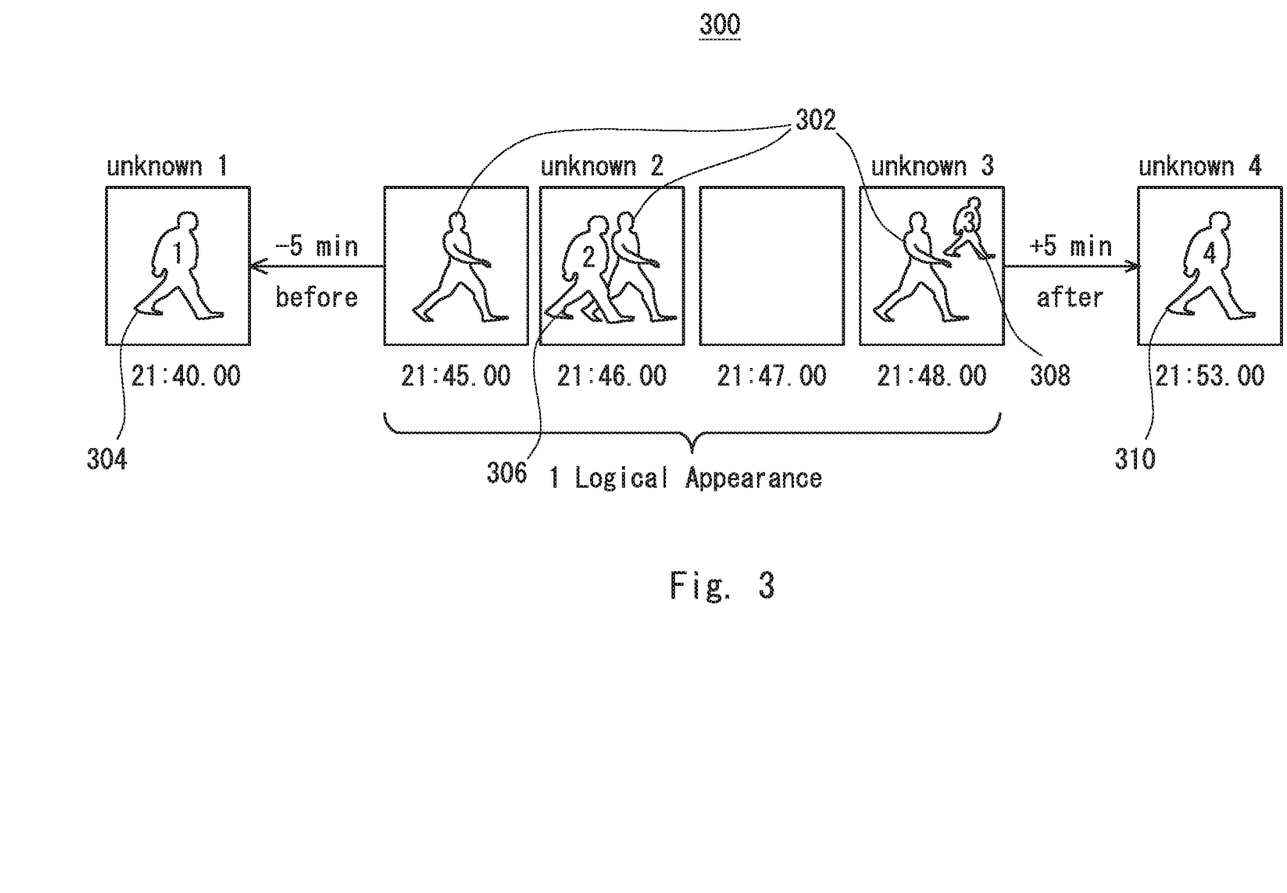
FIG. 3 illustrates a video scene analysis for a single location and a single target person according to various embodiments.

FIG. 3 illustrates a video scene analysis for a single location and a single target person according to various embodiments. A video scene 300 comprises video footage from one or more surveillance cameras of a single location at a particular date. In this embodiment, a first appearance of a target person 302 occurs at 2145 hours and a last appearance of the target person occurs at 2148 hours. Further, a first predetermined duration and a second predetermined duration are both set as 5 minutes. Accordingly, the video scene 300 begins at the first predetermined duration before the first appearance of the target person, which is at 2140 hours, and ends at the second predetermined duration after the last appearance of the target person, which is 2153 hours. Further, the video scene 300 may not require a continuous presence of the target person 302. For example, the target person 302 is not present for 2 minutes between 2146 hours and 2148 hours in the video scene 300. Since the 2 minute absence of the target person 302 is shorter than the second predetermined duration of 5 minutes, the appearance of the target person 302 at 2146 hours is not considered as the last appearance. Therefore, the period of time from 2145 hours to 2148 hours of video scene 300 comprises one logical appearance of the target person 302.

In an embodiment, there may be a third predetermined duration for limiting a duration of each time that a target person can be absent in a video scene. Referring to video scene 300, a third predetermined duration may be set as, for example, 20 minutes. This means that a maximum duration for each time that the target person 302 can be absent in the video scene 300 is 20 minutes. In the video scene 300, the target person 302 is not present for 2 minutes between 2146 hours and 2148 hours. Since the 2 minute absence of the target person 302 is shorter than the third predetermined duration of 20 minutes, the appearance of the target person 302 at 2146 hours is not considered as a last appearance. Therefore, the period of time from 2145 hours to 2148 hours of video scene 300 comprises one logical appearance of the target person 302. If, for example, the period of absence starting from 2147 hours of the target person 302 exceeds the third predetermined duration, the video scene 300 will instead end at the second predetermined duration of 5 minutes after 2147 hours, at 2152 hours. Further, if the target person 302 then reappears in the plurality of videos after 2152 hours, for example at 2230 hours, a new video scene will be established starting at the first predetermined duration of 5 minutes before 2230 hours, at 2225 hours. In this case, the period of time from 2145 hours to 2147 hours comprises one logical appearance of the target person 302, and the period of time that starts at 2230 hours until a next last appearance of the target person 302 comprises another logical appearance of the target person 302. It will be appreciated that the first, second and third predetermined duration may be set to any duration that may be deemed suitable for analysis of the video scenes.

Next, individuals other than the target person 302 are identified. In the video scene 300, a first unknown individual 304 appears walking alone at 2140 hours, a second unknown individual 306 appears walking beside the target person 302 at 2146 hours, a third unknown individual 308 appears walking at a distance from target person 302, and a fourth unknown individual 310 is seen walking alone at 2153 hours. Accordingly, an attribute of each of these four unknown individuals are determined for comparison with other video scenes. For example, the attribute may be facial information which may be determined from captured videos of the each of the four unknown individuals' faces. The attribute may also be a physical characteristic of each of the four unknown individuals, for example height, body size, hair colour, skin colour, and other physical features or combinations thereof. The attribute may also be a behavioural characteristic of each of the four unknown individuals such as, for example, the way each of the four unknown individuals walk, stand, move, talk, other similar characteristics or combinations thereof.

Figure 4:
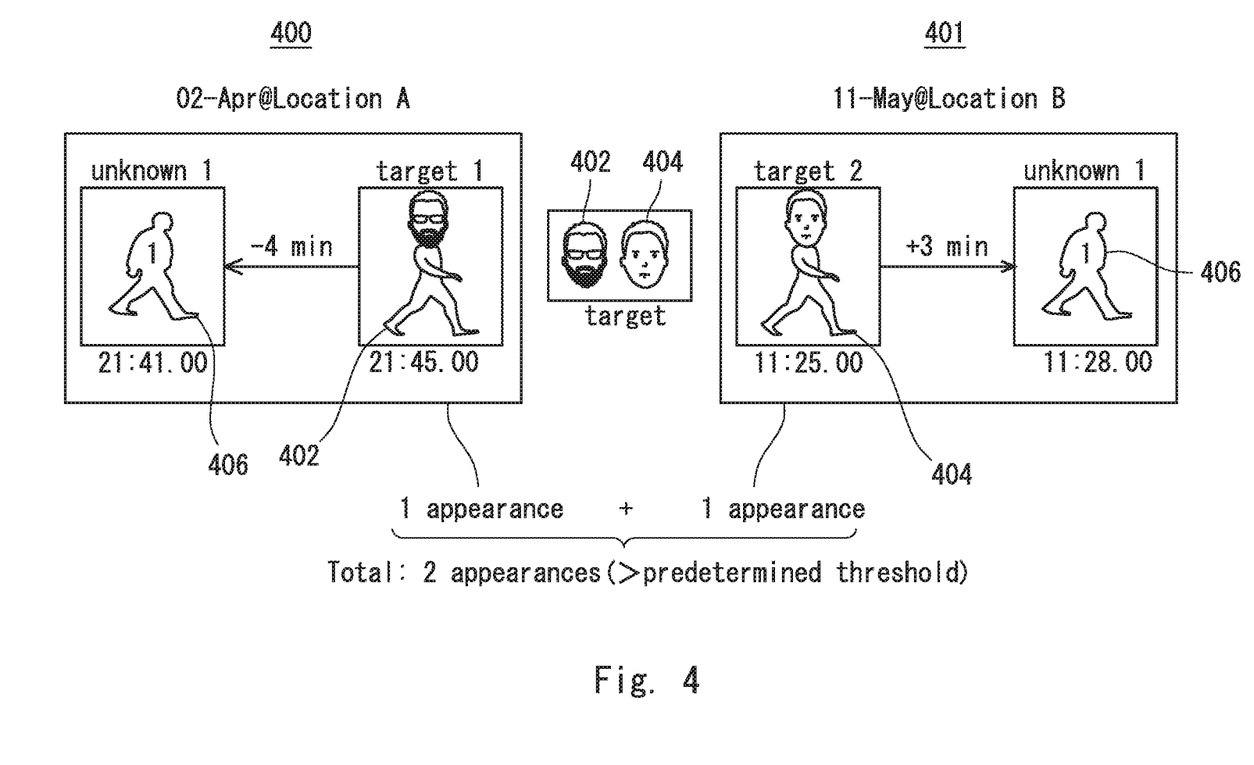
FIG. 4 illustrates a video scene analysis for more than one location and more than one target person according to various embodiments.

FIG. 4 illustrates a video scene analysis for more than one location and more than one target person according to various embodiments. Two video scenes 400 and 401 are being analysed. Video scene 400 comprises video surveillance footage for a Location A on 2nd April, at which a first target person 402 appears at 2145 hours. Video scene 401 comprises video surveillance footage for a Location B on 11th May, at which a second target person 404 appears at 1125 hours. In video scene 400, an unknown individual 406 appears at 2141 hours, 4 minutes before the appearance of the target person 402. In video scene 401, the same unknown individual 406 appears at 1128 hours, 3 minutes after the appearance of target person 404. Accordingly, the unknown individual 406 is now determined to appear in 2 video scenes. In an embodiment where the predetermined threshold number is set as 1, the unknown individual 406 will be identified as a potential associate of target persons 402 and 404.

Figure 5:
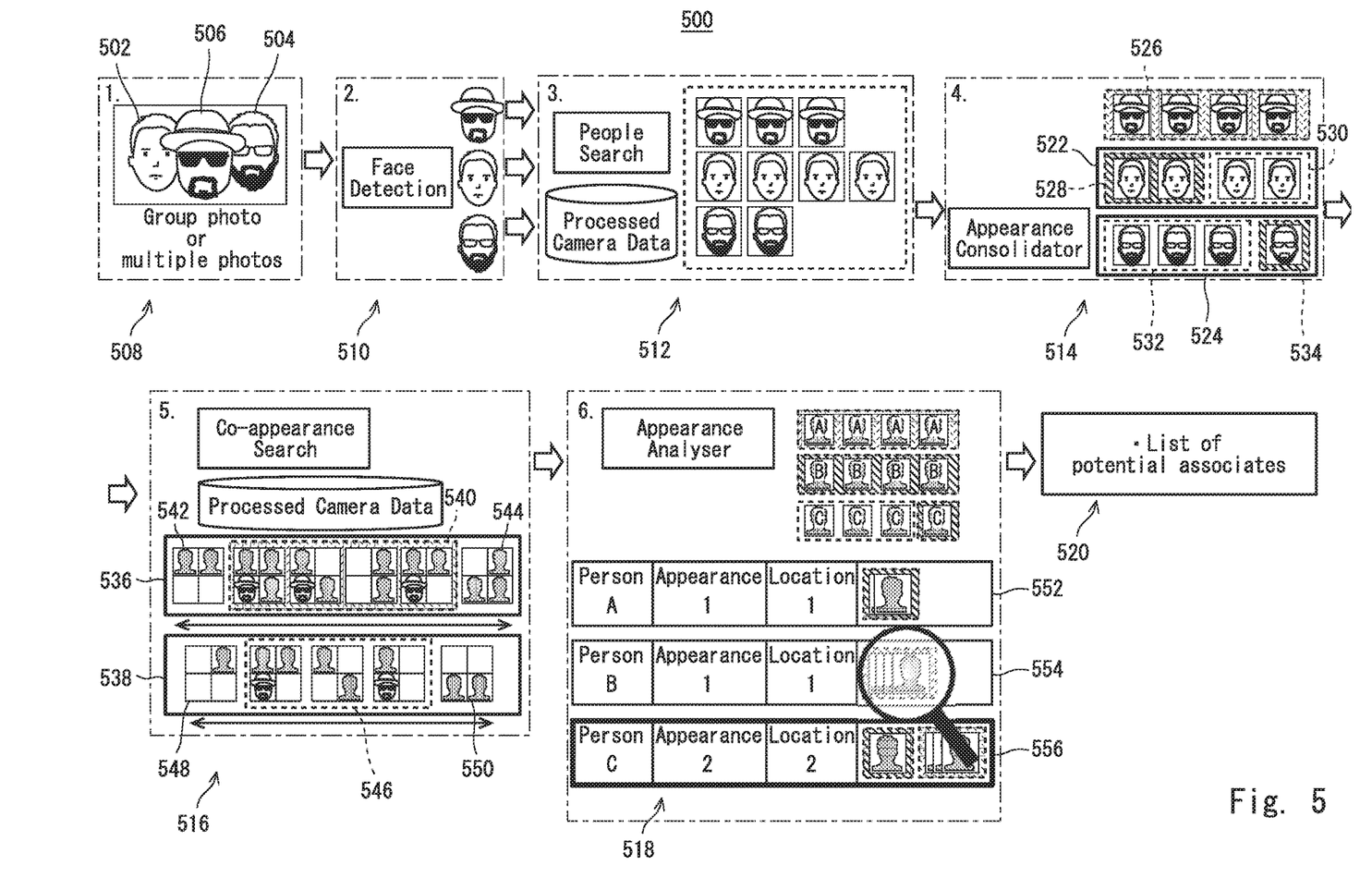
FIG. 5 shows an illustration of how potential associates are identified according to various embodiments.

FIG. 5 shows an illustration 500 of how potential associates are identified. Firstly, an attribute of at least one target person is determined. For example, the attribute may be facial information of the at least one target person which may be determined from a picture of the at least one target person's face. The attribute may also be a physical characteristic of the at least one target person, for example height, body size, hair colour, skin colour, and other physical features or combinations thereof. The attribute may also be a behavioural characteristic of the at least one target person such as, for example, the way the at least one target person walks, stands, moves, talks, other similar characteristics or combinations thereof. In the present embodiment, at 508, a group photo or multiple photos of three target persons 502, 504 and 506 are provided. At 510, facial information of target persons 502, 504 and 506 are detected from the provided photos. The detected facial information may then be used as the attribute. It will be appreciated that the photographs may be physical copies or soft copies, where the physical copies may be scanned to detect the facial features of the target persons. Further, other mediums such as videos can also be used for determining the attributes.

Further, a plurality of videos is provided. The plurality of videos may be video recordings of locations captured by surveillance cameras, hand phone cameras, CCTV (closed-circuit television) cameras, web-cams or other similar devices. The locations may be places where the at least one target person has been seen, known to have been to or frequented, or suspected locations where the at least one target person provides or receives information to or from associates of the same criminal group. The plurality of videos may be in a file format such as mp4, avi, mkv, wmv, mov or other similar video format. Further, each of the plurality of videos may indicate a time, date and location at which each respective video is recorded. In an embodiment, the plurality of videos may be processed into an entry database consisting of one or more entries, wherein each of the one or more entries represents an appearance of a person at a time, date and location in the plurality of videos, wherein each of the one or more entries indicates an attribute of the person.

At 512, appearances of the three target persons 502, 504 and 506 are identified from the plurality of videos. This may be achieved by identifying, from the plurality of videos, an individual possessing the determined attribute as the respective target person. In the present embodiment, the attribute used for the identification of target persons 502, 504 and 506 in the plurality of videos is the facial information as determined in 510. For example, an individual appearing in the plurality of videos and having the same facial information as target person 502 will be identified as the target person 502, an individual appearing in the plurality of videos and having the same facial information as target person 504 will be identified as the target person 504, and an individual appearing in the plurality of videos and having the same facial information as target person 506 will be identified as the target person 506.

After identifying all video appearances of the target persons 502, 504 and 506 in the plurality of videos, at 514, an appearance consolidator consolidates the identified video appearances of the three target persons 502, 504 and 506 from the plurality of videos. For example, identified video appearances 522 is based on the identified appearances in the plurality of videos of target person 502, identified video appearances 524 is based on the identified appearances in the plurality of videos of target person 504 and identified video appearances 526 is based on the identified appearances in the plurality of videos of target person 506. The consolidation may be based on a time range, a date, a location or a combination thereof, wherein identified appearances of a target person that occur at a same location, date and/or time range may be grouped together to form a logical appearance sequence.

The identified video appearances of the target persons may come from one or more videos of the plurality of videos. In the present embodiment, identified video appearances 526 is based on appearances of target person 506 in one or more videos of the plurality of videos, wherein the one or more videos may occur at a same time range, date, location or a combination thereof, such that the video appearances 526 comprises one logical appearance of the target person 506. Identified video appearances 522 is based on appearances of target person 502 in at least two videos of the plurality of videos, where video appearances 528 of target person 502 are identified from a first batch of one or more videos, and video appearances 530 of target person 502 are identified from a second batch of one or more videos. The first batch of one or more videos may occur at a same time range, date, location or a combination thereof, such that the video appearances 528 comprises one logical appearance of the target person 502. Likewise, the second batch of one or more videos may occur at a same time range, date, location or a combination thereof, such that the video appearances 530 comprises one logical appearance of the target person 502. For example, the first and second batch of one or more videos may be surveillance videos of a location recorded on a same date, where video appearances 528 of target person 502 from the first batch of one or more videos may be occurring at an earlier time and video appearances 530 of target person 502 from the second batch of one or more videos may be occurring at a later time, such that video appearances 528 forms a first logical appearance of target person 502, while video appearances 530 forms a second logical appearance of target person 502. Accordingly, the consolidated video appearances 522 comprises two logical appearances of target person 502.

Further, identified appearances 524 is based on appearances of target person 504 in at least two videos of the plurality of videos, where video appearances 532 of target person 504 are identified from a first batch of one or more videos, and video appearances 534 of target person 504 are identified from a second batch of one or more videos. The first batch of one or more videos may occur at a same time range, date, location or a combination thereof, such that the video appearances 532 comprises one logical appearance of the target person 504. Likewise, the second batch of one or more videos may occur at a same time range, date, location or a combination thereof, such that the video appearances 534 comprises one logical appearance of the target person 504. For example, the first and second batch of one or more videos may be surveillance videos of a location recorded on a same date, where video appearances 532 of target person 504 from the first batch of one or more videos may be occurring at an earlier time and video appearances 534 of target person 504 from the second batch of one or more videos may be occurring at a later time, such that video appearances 532 forms a first logical appearance of target person 504, while video appearances 534 from a second logical appearance of target person 504. Accordingly, the consolidated video appearances 524 comprises two logical appearances of target person 504. It will be appreciated that more than one consolidated video appearances for each target person may be formed based on the identified appearances, where each consolidated appearance may correspond to a time range, a date, a location, or combinations thereof in which the identified appearances occur in the plurality of videos.

Based on the identified logical appearances that are consolidated at 514, a plurality of video scenes is established by the appearance consolidator. At 516, video scene 536 is established based on, for example, the consolidated appearances 526 of target person 506. The video scene 536 comprises a first portion 540, a second portion 542 and a third portion 544. The first portion 540 may comprise a one or more video footages from which consolidated video appearances 526 of target person 506 are identified. The first portion 540 may further comprise one or more video footages in which appearances of the target person 506 are not found, but these one or more video footages are of a time, a date, a location, or combinations thereof that matches the time, the date, the location, or combinations thereof of the one or more video footages from which the consolidated video appearances 526 of target person 506 are identified. Advantageously, this will take into consideration all available surveillance footage of a location, so as to cover scenarios in which the target person is at a spot where only one of the surveillance cameras can capture the person on video.

In addition to the first portion 540 of the video scene 536, the second portion 542 extends the duration of the video scene 536 by a first predetermined duration, such that the video scene 536 begins at the first predetermined duration before a first appearance of the target person 506 as identified in the first portion 540 of the video scene 536. Accordingly, the second portion 542 may comprise one or more video footages of a time, a date, a location, or combinations thereof that matches the time, the date, the location, or combinations thereof of the one or more video footages of the first portion 540 of video scene 536, wherein the one or more video footages of the second portion 542 begins at the first predetermined duration before the first appearance of the target person 506 as identified in the first portion 540 of the video scene 536. Advantageously, the inclusion of the second portion 542 of the video scene 536 allows identification of potential associates of the target person 506 even if they are not co-appearing together with the target person 506 in the videos, but only appearing before the target person 506 arrives at the recorded location, possibly just to leave an object for retrieval by the target person 506.

Further, there is the third portion 544 of the video scene 536 that extends the duration of the video scene 536 by a second predetermined duration, such that the video scene 536 ends at the second predetermined duration after a last appearance of the target person 506 as identified in the first portion 540 of the video scene 536. Accordingly, the third portion 544 may comprise one or more video footages of a time, a date, a location, or combinations thereof that matches the time, the date, the location, or combinations thereof of the one or more video footages of the first portion 540 of video scene 536, wherein the one or more video footages of the third portion 544 ends at the second predetermined duration after the last appearance of the target person 506 as identified in the first portion 540 of the video scene 536. Advantageously, the inclusion of the third portion 544 of the video scene 536 allows identification of potential associates of the target person 506 even if they are not co-appearing together with the target person 506 in the videos, but only appearing after the target person 506 leaves the recorded location, possibly to retrieve an object that was intentionally left behind by the target person 506.

Similar to video scene 536, video scene 538 is established based on, for example, video appearances 532 in the consolidated appearances 524 of target person 504. The video scene 538 comprises a first portion 546, a second portion 548 and a third portion 550. The first portion 546 may comprise one or more video footages from which video appearances 532 of target person 504 are identified. The first portion 546 may further comprise one or more video footages in which appearances of the target person 504 are not found, but these one or more video footages are of a time, a date, a location, or combinations thereof that matches the time, the date, the location, or combinations thereof of the one or more video footages from which the consolidated video appearances 532 of target person 504 are identified. Advantageously, this will take into consideration all available surveillance footage of a location, so as to cover scenarios in which the target person is at a spot where only one of the surveillance cameras can capture the person on video.

In addition to the first portion 546 of the video scene 538, the second portion 548 extends the duration of the video scene 538 by a first predetermined duration, such that the video scene 538 begins at the first predetermined duration before a first appearance of the target person 504 as identified in the first portion 546 of the video scene 538. Accordingly, the second portion 548 may comprise one or more video footages of a time, a date, a location, or combinations thereof that matches the time, the date, the location, or combinations thereof of the one or more video footages of the first portion 546 of video scene 538, wherein the one or more video footages of the second portion 548 begins at the first predetermined duration before the first appearance of the target person 504 as identified in the first portion 546 of the video scene 538. Advantageously, the inclusion of the second portion 548 of the video scene 538 allows identification of potential associates of the target person 504 even if they are not co-appearing together with the target person 504 in the videos, but only appearing before the target person 504 arrives at the recorded location, possibly just to leave an object for retrieval by the target person 504.

Further, there is the third portion 550 of the video scene 538 that extends the duration of the video scene 538 by a second predetermined duration, such that the video scene 538 ends at the second predetermined duration after a last appearance of the target person 504 as identified in the first portion 546 of the video scene 538. Accordingly, the third portion 550 may comprise one or more video footages of a time, a date, a location, or combinations thereof that matches the time, the date, the location, or combinations thereof of the one or more video footages of the first portion 546 of video scene 538, wherein the one or more video footages of the third portion 550 ends at the second predetermined duration after the last appearance of the target person 504 as identified in the first portion 546 of the video scene 538. Advantageously, the inclusion of the third portion 550 of the video scene 538 allows identification of potential associates of the target person 504 even if they are not co-appearing together with the target person 504 in the videos, but only appearing after the target person 504 leaves the recorded location, possibly to retrieve an object that was intentionally left behind by the target person 504.

After establishment of the video scenes 536 and 538, a co-appearance search module determines every individual besides the target persons 502, 504 and 506 who appear in the video scenes. The determination process may comprise determining an attribute of each of the one or more individuals who appear in any of the video scenes 536 and 538. The attribute may be, for example, facial information, physical characteristics, behaviour characteristics, other similar characteristics or combinations thereof that may be used to identify each of the one or more individuals. The determination process may further comprise determining a time, a date, a location, a target person who appeared in the same video scene as the respective individual, or combinations thereof for each of the one or more individuals who appear in any of the video scenes 536 and 538. The determination process includes all three portions 540, 542 and 544 of video scene 536, as well as all three portions 546, 548 and 550 of video scene 538. Advantageously, individuals who appear within the first predetermined duration before the first appearance of the respective target person in the respective video scene, and individuals who appear within the second predetermined duration after the last appearance of the respective target person in the respective video scene are considered in the determination process. It will be understood that video scenes will similarly be established for each of the remaining video appearances 528, 530 and 534, where these video scenes will also be considered in the determination process.

After determining each of the one or more individuals appearing in the video scenes 536 and 538, an appearance analyser determines the individuals who appear in more than a predetermined threshold number of the video scenes. Referring to 518, three persons A, B and C are found to have appeared in any of the video scene 536 and/or video scene 538. In the present embodiment, the determination process comprises determining an attribute and a location for each of the one or more individuals who appear in any of the video scenes 536 and 538, where video scene 536 comprises one or more camera surveillance footage of a first location and video scene 538 comprises one or more camera surveillance footage of a second location. Based on the results of the co-appearance search module at 516, Person A is found to have appeared in the video scene 536. Accordingly, as shown in 552, Person A has one appearance in one location. Person B is found to have appeared in the video scene 538. Accordingly, as shown in 554, Person B also has one appearance in one location. Person C, however, is found to have appeared in both video scenes 536 and 538. Accordingly, as shown in 556, Person C has two appearances in two locations.

In the present embodiment, the predetermined threshold number is set as 1. Therefore, if an individual is determined to have appeared in 2 or more video scenes, the individual is then determined to be a potential associate of the target persons. In this case, since Person C is found to have appeared in two video scenes, namely video scene 536 and video scene 538, Person C will be output at 520 as the potential associate of target persons 506 and 508. It will be understood that the predetermined threshold number may be set according to any other number that may produce an optimal result, and may vary according to the number of video scenes being considered.

Figure 6:
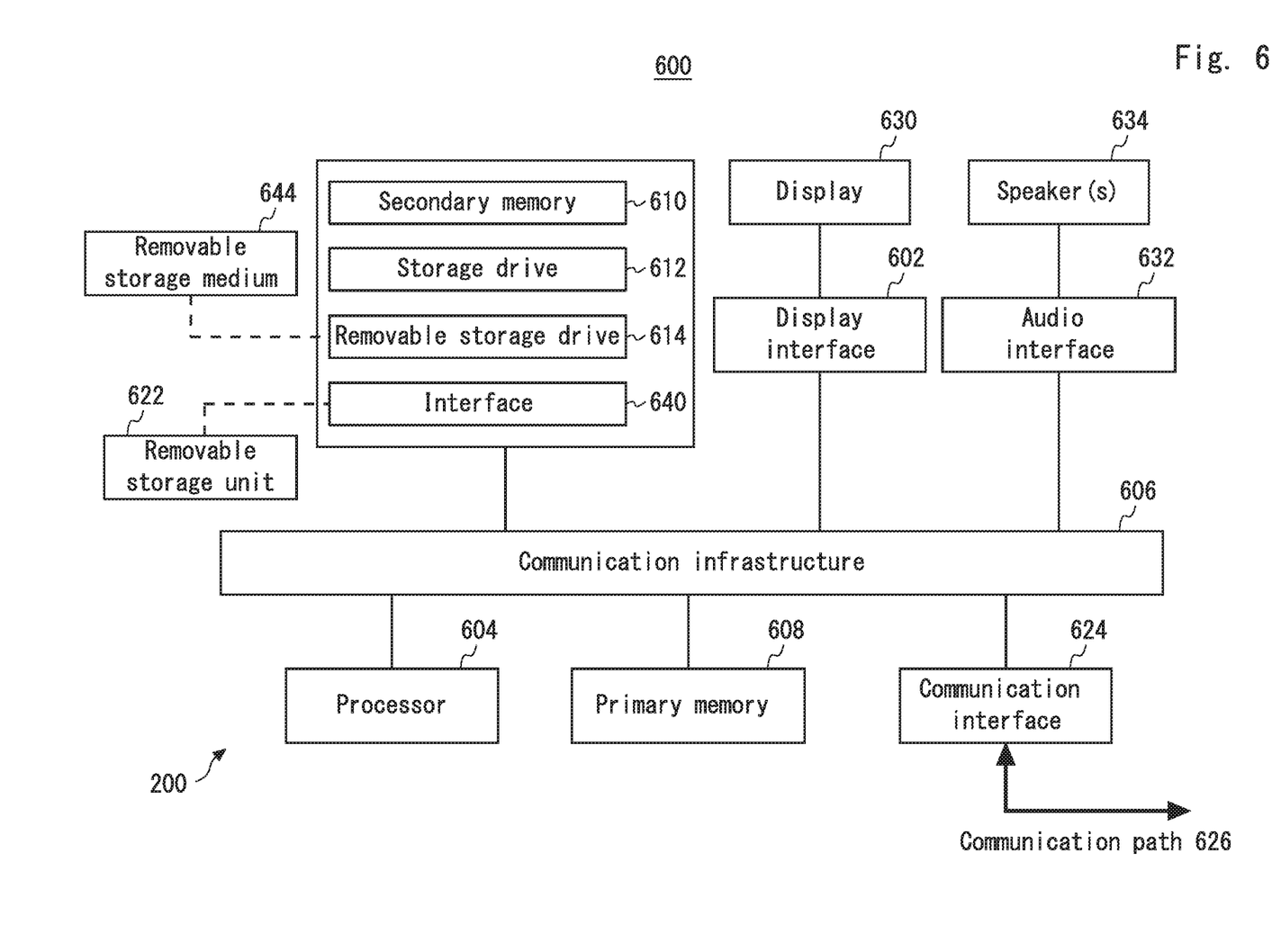
FIG. 6 depicts an exemplary device according to various embodiments.

FIG. 6 depicts an exemplary computing device 600, hereinafter interchangeably referred to as a computer system 600 or as a device 600, where one or more such computing devices 600 may be used to implement the identification device 200 shown in FIG. 2. The following description of the computing device 600 is provided by way of example only and is not intended to be limiting.

As shown in FIG. 6, the example computing device 600 includes a processor 604 for executing software routines. Although a single processor is shown for the sake of clarity, the computing device 600 may also include a multi-processor system. The processor 604 is connected to a communication infrastructure 606 for communication with other components of the computing device 600. The communication infrastructure 606 may include, for example, a communications bus, cross-bar, or network.

The computing device 600 further includes a primary memory 608, such as a random access memory (RAM), and a secondary memory 610. The secondary memory 610 may include, for example, a storage drive 612, which may be a hard disk drive, a solid state drive or a hybrid drive and/or a removable storage drive 614, which may include a magnetic tape drive, an optical disk drive, a solid state storage drive (such as a USB flash drive, a flash memory device, a solid state drive or a memory card), or the like. The removable storage drive 614 reads from and/or writes to a removable storage medium 644 in a well-known manner. The removable storage medium 644 may include magnetic tape, optical disk, non-volatile memory storage medium, or the like, which is read by and written to by removable storage drive 614. As will be appreciated by persons skilled in the relevant art(s), the removable storage medium 644 includes a computer readable storage medium having stored therein computer executable program code instructions and/or data.

In an alternative implementation, the secondary memory 610 may additionally or alternatively include other similar means for allowing computer programs or other instructions to be loaded into the computing device 600. Such means can include, for example, a removable storage unit 622 and an interface 640. Examples of a removable storage unit 622 and interface 640 include a program cartridge and cartridge interface (such as that found in video game console devices), a removable memory chip (such as an EPROM or PROM) and associated socket, a removable solid state storage drive (such as a USB flash drive, a flash memory device, a solid state drive or a memory card), and other removable storage units 622 and interfaces 640 which allow software and data to be transferred from the removable storage unit 622 to the computer system 600.

The computing device 600 also includes at least one communication interface 624. The communication interface 624 allows software and data to be transferred between computing device 600 and external devices via a communication path 626. In various embodiments of the inventions, the communication interface 624 permits data to be transferred between the computing device 600 and a data communication network, such as a public data or private data communication network. The communication interface 624 may be used to exchange data between different computing devices 600 which such computing devices 600 form part an interconnected computer network. Examples of a communication interface 624 can include a modem, a network interface (such as an Ethernet card), a communication port (such as a serial, parallel, printer, GPIB, IEEE 1394, RJ45, USB), an antenna with associated circuitry and the like. The communication interface 624 may be wired or may be wireless. Software and data transferred via the communication interface 624 are in the form of signals which can be electronic, electromagnetic, optical or other signals capable of being received by communication interface 624. These signals are provided to the communication interface via the communication path 626.

As shown in FIG. 6, the computing device 600 further includes a display interface 602 which performs operations for rendering images to an associated display 630 and an audio interface 632 for performing operations for playing audio content via associated speaker(s) 634.

As used herein, the term "computer program product" (or computer readable medium, which may be a non-transitory computer readable medium) may refer, in part, to removable storage medium 644, removable storage unit 622, a hard disk installed in storage drive 612, or a carrier wave carrying software over communication path 626 (wireless link or cable) to communication interface 624. Computer readable storage media (or computer readable media) refers to any non-transitory, non-volatile tangible storage medium that provides recorded instructions and/or data to the computing device 600 for execution and/or processing. Examples of such storage media include magnetic tape, CD-ROM, DVD, Blu-Ray™ Disc, a hard disk drive, a ROM or integrated circuit, a solid state storage drive (such as a USB flash drive, a flash memory device, a solid state drive or a memory card), a hybrid drive, a magneto-optical disk, or a computer readable card such as a PCMCIA card and the like, whether or not such devices are internal or external of the computing device 600. Examples of transitory or non-tangible computer readable transmission media that may also participate in the provision of software, application programs, instructions and/or data to the computing device 600 include radio or infra-red transmission channels as well as a network connection to another computer or networked device, and the Internet or Intranets including e-mail transmissions and information recorded on Websites and the like.

The computer programs (also called computer program code) are stored in primary memory 608 and/or secondary memory 610. Computer programs can also be received via the communication interface 624. Such computer programs, when executed, enable the computing device 600 to perform one or more features of embodiments discussed herein. In various embodiments, the computer programs, when executed, enable the processor 604 to perform features of the above-described embodiments. Accordingly, such computer programs represent controllers of the computer system 600.

Software may be stored in a computer program product and loaded into the computing device 600 using the removable storage drive 614, the storage drive 612, or the interface 640. The computer program product may be a non-transitory computer readable medium.

Alternatively, the computer program product may be downloaded to the computer system 600 over the communications path 626. The software, when executed by the processor 604, causes the computing device 600 to perform functions of embodiments described herein.

It is to be understood that the embodiment of FIG. 6 is presented merely by way of example. Therefore, in some embodiments one or more features of the computing device 600 may be omitted. Also, in some embodiments, one or more features of the computing device 600 may be combined together. Additionally, in some embodiments, one or more features of the computing device 600 may be split into one or more component parts. The primary memory 608 and/or the secondary memory 610 may serve(s) as the memory for the device 200; while the processor 604 may serve as the processor of the identification device 200.

Some portions of the description herein are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the description herein, it will be appreciated that throughout the present specification, discussions utilizing terms such as "receiving", "providing", "identifying", "scanning", "determining", "generating", "outputting", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a computer or other device selectively activated or reconfigured by a computer program stored in the computer. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer suitable for executing the various methods/processes described herein will appear from the description herein.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the GSM mobile telephone system. The computer program when loaded and executed on such a computer effectively results in an apparatus that implements the steps of the preferred method.

According to various embodiments, a "module" may be understood as any kind of a logic implementing entity, which may be special purpose circuitry or a processor executing software stored in a memory, firmware, or any combination thereof. Thus, in an embodiment, a "module" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "module" may also be a processor executing software, e.g. any kind of computer program, e.g. a computer program using a virtual machine code such as e.g. Java. Any other kind of implementation of the respective functions which will be described in more detail below may also be understood as a "module" in accordance with an alternative embodiment.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

For example, the whole or part of the exemplary embodiments disclosed above can be described as, but not limited to, the following supplementary notes.

(Supplementary Note 1)
A method for identifying potential associates of at least one target person, the method comprising:
providing a plurality of videos;
identifying appearances of the at least one target person in the plurality of videos;
establishing a plurality of video scenes from the plurality of videos, wherein each one of the plurality of video scenes begins at a first predetermined duration before a first appearance of the at least one target person in the respective video scene and ends at a second predetermined duration after a last appearance of said at least one target person in the respective video scene;
determining individuals who appear in more than a predetermined threshold number of the plurality of video scenes; and
identifying the individuals as potential associates of the at least one target person.

(Supplementary Note 2)
The method according to note 1, wherein identifying the appearances of a respective target person of the at least one target person from the plurality of videos further comprises:
determining an attribute of the respective target person; and
identifying, from the plurality of videos, an individual possessing the attribute as the respective target person.

(Supplementary Note 3)
The method according to note 2, wherein the attribute further comprises facial information of the respective target person.

(Supplementary Note 4)
The method according to note 2, wherein the attribute further comprises a physical characteristic of the respective target person.

(Supplementary Note 5)
The method according to note 2, wherein the attribute further comprises a behavioural characteristic of the respective target person.

(Supplementary Note 6)
The method according to note 1, wherein any one of the plurality of video scenes further comprises one or more camera surveillance footage of a location.

(Supplementary Note 7)
The method according to note 6, wherein each of the one or more camera surveillance footage shows a different view of the location.

(Supplementary Note 8)
An identification device configured to identify potential associates of at least one target person, the identification device comprising:
a receiving module configured to receive a plurality of videos;
an appearance search module configured to identify appearances of the at least one target person in the plurality of videos;
an appearance consolidator module configured to establish a plurality of video scenes from the plurality of videos, wherein each one of the plurality of video scenes begins at a first predetermined duration before a first appearance of the at least one target person in the respective video scene and ends at a second predetermined duration after a last appearance of said at least one target person in the respective video scene;
a co-appearance search module configured to search for individuals who appear in the plurality of video scenes;
an appearance analyzer module configured to determine which of the individuals appear in more than a predetermined threshold number of the plurality of video scenes; and
an output module configured to identify the individuals who appear in more than a predetermined threshold number of the plurality of video scenes as the potential associates of the at least one target person.

(Supplementary Note 9)
The identification device according to note 8, wherein the appearance search module is further configured to:
determine an attribute of a respective target person of the at least one target person; and identify, from the plurality of videos, an individual possessing the attribute as the respective target person.

(Supplementary Note 10)

The identification device according to note 9, wherein the attribute further comprises facial information of the respective target person.

(Supplementary Note 11)

The identification device according to note 9, wherein the attribute further comprises a physical characteristic of the respective target person.

(Supplementary Note 12)

The identification device according to note 9, wherein the attribute further comprises a behavioural characteristic of the respective target person.

(Supplementary Note 13)

The identification device according to note 8, wherein any one of the plurality of video scenes further comprises one or more camera surveillance footage of a location.

(Supplementary Note 14)

The identification device according to note 13, wherein each of the one or more camera surveillance footage shows a different view of the location.

(Supplementary Note 15)

A non-transitory computer readable medium having stored thereon instructions which, when executed by a processor, make the processor carry out a method for identifying potential associates of at least one target person, the method comprising:

receiving a plurality of videos;

identifying appearances of the at least one target person in the plurality of videos;

establishing a plurality of video scenes from the plurality of videos, wherein each one of the plurality of video scenes begins at a first predetermined duration before a first appearance of the at least one target person in the respective video scene and ends at a second predetermined duration after a last appearance of said at least one target person in the respective video scene;

determining individuals who appear in more than a threshold number of the plurality of video scenes; and identifying the individuals as potential associates of the at least one target person.

This application is based upon and claims the benefit of priority from Singapore Patent Application No. 10201807678 W, filed on Sep. 6, 2018, the disclosure of which is incorporated herein in its entirety by reference.

REFERENCE SIGNS LIST

202 Receiving Module
204 Appearance Search Module
206 Consolidator Module
208 Co-appearance Search Module
210 Analyser Module
212 Output Module
302 Target Person
304 First Unknown Individual
306 Second Unknown Individual
308 Third Unknown Individual
402 First Target Person
404 Second Target Person
406 Unknown Individual

The invention claimed is:

1. A method for identifying potential unknown associates of at least one target person, the method comprising:

providing a plurality of videos;

identifying appearances of the at least one target person in the plurality of videos;

establishing a plurality of video scenes from the plurality of videos, wherein each one of the plurality of video scenes begins at a first predetermined duration before a first appearance of the at least one target person in the respective video scene and ends at a second predetermined duration after a last appearance of said at least one target person in the respective video scene;

determining individuals as having both appeared in more than a predetermined threshold number of the plurality of video scenes and also as being different from the at least one target person; and identifying the individuals as the potential unknown associates of the at least one target person.

2. The method according to claim 1, wherein identifying the appearances of a respective target person of the at least one target person from the plurality of videos further comprises:

determining an attribute of the respective target person; and identifying, from the plurality of videos, an individual possessing the attribute as the respective target person.

3. The method according to claim 2, wherein the attribute further comprises facial information of the respective target person.

4. The method according to claim 2, wherein the attribute further comprises a physical characteristic of the respective target person.

5. The method according to claim 2, wherein the attribute further comprises a behavioural characteristic of the respective target person.

6. The method according to claim 1, wherein any one of the plurality of video scenes further comprises one or more camera surveillance footage of a location.

7. The method according to claim 6, wherein each of the one or more camera surveillance footage shows a different view of the location.

8. An identification device configured to identify potential unknown associates of at least one target person, the identification device comprising:

at least one memory storing instructions, and at least one processor configured to execute the instructions to;

receive a plurality of videos;

identify appearances of the at least one target person in the plurality of videos;

establish a plurality of video scenes from the plurality of videos, wherein each one of the plurality of video scenes begins at a first predetermined duration before a first appearance of the at least one target person in the respective video scene and ends at a second predetermined duration after a last appearance of said at least one target person in the respective video scene;

search for individuals as having both appeared in the plurality of video scenes and also as being different from the at least one target person;

determine which of the individuals appear in more than a predetermined threshold number of the plurality of video scenes; and identify the individuals who appear in more than a predetermined threshold number of the plurality of video scenes as the potential unknown associates of the at least one target person.

9. The identification device according to claim 8, wherein the processor configured to execute the instructions to;

determine an attribute of a respective target person of the at least one target person; and identify, from the plurality of videos, an individual possessing the attribute as the respective target person.

10. The identification device according to claim 9, wherein the attribute further comprises facial information of the respective target person.

11. The identification device according to claim 9, wherein the attribute further comprises a physical characteristic of the respective target person.

12. The identification device according to claim 9, wherein the attribute further comprises a behavioural characteristic of the respective target person.

13. The identification device according to claim 8, wherein any one of the plurality of video scenes further comprises one or more camera surveillance footage of a location.

14. The identification device according to claim 13, wherein each of the one or more camera surveillance footage shows a different view of the location.

15. A non-transitory computer readable medium having stored thereon instructions which, when executed by a processor, make the processor carry out a method for identifying potential unknown associates of at least one target person, the method comprising:
- receiving a plurality of videos;
- identifying appearances of the at least one target person in the plurality of videos;
- establishing a plurality of video scenes from the plurality of videos, wherein each one of the plurality of video scenes begins at a first predetermined duration before a first appearance of the at least one target person in the respective video scene and ends at a second predetermined duration after a last appearance of said at least one target person in the respective video scene;
- determining individuals as having both appeared in more than a threshold number of the plurality of video scenes and as also being different from the at least one target person; and
- identifying the individuals as the potential unknown associates of the at least one target person.

* * * * *